US012434248B2

(12) United States Patent
Jiang et al.

(10) Patent No.: US 12,434,248 B2
(45) Date of Patent: Oct. 7, 2025

(54) SOLID MATERIAL GRINDING METHOD AND DEVICE WITH ADJUSTABLE DISCHARGE SIZE

(71) Applicant: INFINITY INTELLIGENCE & INFORMATION (SUZHOU) TECHNOLOGY CO., LTD., Suzhou (CN)

(72) Inventors: Ying Jiang, Suzhou (CN); Yunfei Luo, Suzhou (CN); Xun Shao, Suzhou (CN); Weidi Yin, Suzhou (CN)

(73) Assignee: INFINITY INTELLIGENCE & INFORMATION (SUZHOU) TECHNOLOGY CO., LTD., Suzhou (CN)

( * ) Notice: Subject to any disclaimer, the term of this patent is extended or adjusted under 35 U.S.C. 154(b) by 387 days.

(21) Appl. No.: 18/017,091

(22) PCT Filed: Jul. 23, 2020

(86) PCT No.: PCT/CN2020/103892
§ 371 (c)(1),
(2) Date: Jan. 20, 2023

(87) PCT Pub. No.: WO2022/016472
PCT Pub. Date: Jan. 27, 2022

(65) Prior Publication Data

US 2023/0294102 A1 Sep. 21, 2023

(30) Foreign Application Priority Data

Jul. 21, 2020 (CN) ........................ 202010705377.2

(51) Int. Cl.
*B02C 7/14* (2006.01)
*B02C 7/04* (2006.01)
(Continued)

(52) U.S. Cl.
CPC .................. *B02C 7/14* (2013.01); *B02C 7/12* (2013.01); *B02C 7/16* (2013.01); *B02C 23/10* (2013.01); *B02C 23/26* (2013.01)

(58) Field of Classification Search
CPC .... B02C 7/14; B02C 7/12; B02C 7/06; B02C 7/17; B02C 7/04; B02C 7/11; B02C 23/26; B02C 23/24
See application file for complete search history.

(56) References Cited

U.S. PATENT DOCUMENTS 2,839,253 A * 6/1958 Yellot ..................... B02C 21/00 110/106
3,065,919 A 11/1962 Le Roy Burkett et al.
(Continued)

FOREIGN PATENT DOCUMENTS

CN 201157784 Y 12/2008
CN 103706458 A 4/2014
(Continued)

*Primary Examiner* — Mohammed S. Alawadi
(74) *Attorney, Agent, or Firm* — Bayramoglu Law Ofices LLC

(57) ABSTRACT

A solid material grinding method and device with an adjustable discharge size includes a grinding disc housing, and a movable grinding disc and a stationary grinding disc provided in a grinding disc cavity of the grinding disc housing coaxially with grinding surfaces opposite to each other. The movable grinding disc is driven to rotate in the grinding disc housing, thereby grinding materials between the movable grinding disc and the stationary grinding disc. The movable grinding disc is further connected to a pushing mechanism, and the pushing mechanism adjusts the distance between the movable grinding disc and the stationary grinding disc in a push-and-pull manner. A top rectifying blower and a side edge rectifying blower respectively blow gas from an upward side and a lateral side of the movable grinding disc
(Continued)

and the stationary grinding disc. A central rectifying blower blows gas to the center of the stationary grinding disc.

18 Claims, 5 Drawing Sheets

(51) Int. Cl.

| | |
|---|---|
| ***B02C 7/06*** | (2006.01) |
| ***B02C 7/11*** | (2006.01) |
| ***B02C 7/12*** | (2006.01) |
| ***B02C 7/16*** | (2006.01) |
| ***B02C 7/17*** | (2006.01) |
| ***B02C 23/02*** | (2006.01) |
| ***B02C 23/10*** | (2006.01) |
| ***B02C 23/26*** | (2006.01) |
| ***G01N 1/28*** | (2006.01) |

(56) References Cited

U.S. PATENT DOCUMENTS

| | | | | |
|---|---|---|---|---|
| 4,406,409 | A * | 9/1983 | Durek | B02C 13/205 241/39 |
| 2015/0076262 | A1 * | 3/2015 | Lefas | B02C 7/02 241/220 |
| 2017/0297031 | A1 * | 10/2017 | Hummel | B02C 7/08 |
| 2021/0114037 | A1 * | 4/2021 | Alles | B02C 23/26 |

FOREIGN PATENT DOCUMENTS

| | | | |
|---|---|---|---|
| CN | 107199092 | A | 9/2017 |
| CN | 108993682 | A | 12/2018 |
| CN | 209597298 | U | 11/2019 |
| CN | 212549780 | U | 2/2021 |

* cited by examiner

SOLID MATERIAL GRINDING METHOD AND DEVICE WITH ADJUSTABLE DISCHARGE SIZE

CROSS-REFERENCES TO THE RELATED APPLICATIONS

The application is a national stage entry of PCT/CN2020/103892 filed on Jul. 23, 2020, which claims priority to Chinese patent applications No. 202010705377.2 filed on Jul. 21, 2020, the entire contents of which are incorporated herein by reference.

TECHNICAL FIELD

The present disclosure relates to grinding devices, and in particular to a solid material grinding method and device with an adjustable discharge size.

BACKGROUND

To test the physicochemical characteristics of solid minerals, a representative sample is often crushed into a fine particle size for subsequent analysis and testing. Both at home and abroad, the solid minerals are crushed mostly by a gyratory crusher, a cone crusher, a jaw crusher, and a collision-type crusher (e.g., a rod mill, a ball mill, etc.). When one of the common crushing devices mentioned above is used, metals are collided with each other to cause heat, vibration, and large noise in the device, resulting in a waste of input energy. With long-time grinding of the device, the high temperature has a certain impact on the physicochemical characteristics of mineral particles to affect the accuracy of a test result. Therefore, the conventional grinding device has inaccurate size control and frequent occurrence of coarse sizes, and thus, cannot meet subsequent use requirements.

SUMMARY

An objective of the present disclosure is to provide a solid material grinding method and device with an adjustable discharge size, which is applied to crushing solid minerals. With a clearance fit between a movable grinding disc and a stationary grinding disc, the present disclosure prevents collision between metals in the grinding process to obtain a higher energy utilization efficiency. The present disclosure ensures stable properties of mineral particles by reducing a temperature rise in the grinding process and obtains an accurate size of the product by accurately controlling a grinding clearance.

To achieve the above objective, the present disclosure provides the following technical solutions:

A solid material grinding device with an adjustable discharge size is provided.

A grinding disc housing is provided thereon with a feed inlet, a discharge outlet, a top rectifying blower, a side edge rectifying blower, and a central rectifying blower.

A movable grinding disc and a stationary grinding disc are provided in a grinding disc cavity of the grinding disc housing coaxially with grinding surfaces opposite to each other, where the stationary grinding disc is fixed with the grinding disc housing. The movable grinding disc is driven by a drive mechanism to rotate in the grinding disc housing, thereby grinding materials between the movable grinding disc and the stationary grinding disc. The movable grinding disc is further connected to a pushing mechanism, and the pushing mechanism adjusts the distance between the movable grinding disc and the stationary grinding disc in a push-and-pull manner.

The top rectifying blower and the side edge rectifying blower respectively blow gas from an upward side and a lateral side of the movable grinding disc and the stationary grinding disc along a radial direction of the movable grinding disc and the stationary grinding disc. The central rectifying blower blows gas to the center of the stationary grinding disc along an axial direction of the movable grinding disc and the stationary grinding disc.

Preferably, the movable grinding disc and the stationary grinding disc are the same in shape and structure. The movable grinding disc and the stationary grinding disc each are provided in a fan-shaped manner by taking the grinding disc as the main body and the center of the grinding surface of the grinding disc as a circular point with adjacent convex surfaces and concave surfaces. The outer edge surrounding the convex surfaces and the concave surfaces on the grinding surface of the grinding disc refers to a grinding side edge. A grinding cavity is formed between the movable grinding disc and the stationary grinding disc. The concave surfaces are connected to the grinding cavity, and a convex-surface side edge communicates with the concave surfaces and the convex surfaces.

Preferably, adjacent convex surface and concave surface are formed into a group; there are 2-6 groups of the concave and convex surfaces on the grinding surface of the grinding disc.

Preferably, the convex-surface side edge is inclined at a certain angle; the inclined convex-surface side edge has a certain width.

Preferably, the drive mechanism includes:

an outer housing;

a central shaft provided in a central shaft cavity of the outer housing and including one end coaxially connected to the movable grinding disc;

a plurality of fixed bearings sleeved on the central shaft and uniformly distributed along an axial direction of the central shaft;

a chain wheel sleeved on the other end of the central shaft and provided outside the outer housing; and a transmission motor in transmission connection with the chain wheel through a chain.

Preferably, an end portion of the central shaft, a central shaft mounting seat, a movable grinding disc mounting seat, and the movable grinding disc are sequentially and coaxially connected.

Preferably, the pushing mechanism includes:

a master cylinder having an axial direction parallel to the axial direction of the central shaft;

a bearing sleeve connected to one of the fixed bearings; and a connecting plate respectively connected to the bearing sleeve and an end portion of a piston rod in the master cylinder.

Preferably, at least one limiting bolt abuts against the connecting plate through the outer housing; an axial direction of the at least one limiting bolt is parallel to the axial direction of the central shaft.

Preferably, the feed inlet extends toward the center of the stationary grinding disc; a receiving hopper is provided on the feed inlet; a collecting hopper is provided on the discharge outlet.

Preferably, a top cover controlled by a cover-opening cylinder to open and close is provided on an opening of the receiving hopper; a cylinder top cover rectifying blower blowing gas to the receiving hopper is provided on the top cover; a cylinder sidewall rectifying blower blowing gas to the receiving hopper is provided at a lateral side of the receiving hopper and near the top cover.

Preferably, a vibrating sieve controlled by a vibrating motor to vibrate is provided at an outlet of the collecting hopper.

Preferably, the collecting hopper and the feed inlet communicate with each other through a reverse material blowing tube; a reverse blower communicating with a gas-blowing device is further provided on the collecting hopper.

The solid material grinding device with an adjustable discharge size has the following grinding method: feeding materials to the grinding disc housing, where the materials are semi-fluidized through an interaction among the central rectifying blower, the top rectifying blower, and the side edge rectifying blower. Semi-fluidized material particles are crushed through a relative movement between the movable grinding disc and the stationary grinding disc.

The solid material grinding method and device with an adjustable discharge size provided by the present disclosure are applied to crushing solid minerals. With a clearance fit between the movable grinding disc and the stationary grinding disc, the present disclosure prevents collision between metals in the grinding process to obtain a higher energy utilization efficiency. The present disclosure ensures stable properties of mineral particles by reducing a temperature rise in the grinding process and obtains an accurate size of the product by accurately controlling a grinding clearance.

BRIEF DESCRIPTION OF THE DRAWINGS

To describe the technical solutions in the embodiments of the present disclosure or the prior art more clearly, the following briefly describes the accompanying drawings required for describing the embodiments. The accompanying drawings in the following description show merely some embodiments of the present disclosure, and those of ordinary skill in the art may still derive other drawings from these accompanying drawings.

REFERENCE NUMERALS

1. feed inlet, 2. central rectifying blower, 3. stationary grinding disc, 4. grinding disc housing, 5. movable grinding disc, 6. movable grinding disc mounting seat, 7. master cylinder, 8. limiting bolt, 9. chain wheel, 10. connecting plate, 11. central shaft cavity, 12. central shaft, 13. fixed bearing, 14. limiting groove, 15. central shaft mounting seat, 16. grinding disc cavity, 17. top rectifying blower, 18. bearing sleeve, 19. outer housing, 20. vibrating sieve, 21. vibrating motor, and 22. reverse material blowing tube;

101. transmission motor, 102. support seat, 103. base, 104. side edge rectifying blower, 105. collecting hopper, 106. cylinder sidewall rectifying blower, 107. receiving hopper, 108. cylinder top cover rectifying blower, 109. cover-opening cylinder, 110. vent, 111. top cover, and 112. reverse blower; and

201. concave surface, 202. convex surface, 203. grinding cavity, 204. convex-surface side edge, and 205. grinding side edge.

DETAILED DESCRIPTION OF THE EMBODIMENTS

To enable those skilled in the art to better understand the technical solutions of the present disclosure, the present disclosure will be further described in detail below by referring to the accompanying drawings.

It should be noted that relational terms herein such as first and second are merely used to distinguish one entity or operation from another entity or operation without necessarily requiring or implying any actual relationship or order between such entities or operations. Moreover, the terms "include", "comprise", or any other variants thereof are intended to cover non-exclusive inclusion, so that a process, method, article, or terminal device including a series of elements not only includes those elements but also includes those elements that are not explicitly listed or also includes elements inherent to the process, method, article or terminal device. Without additionally recited limitations, the elements defined by the sentence "include . . . " or "including . . . " do not exclude the existence of other elements in the process, method, article, or terminal device that includes the elements. In addition, herein, "greater than", "less than", "more than", etc. are understood as not including the reference number itself, and "above", "below", "within", etc. are understood as including the reference number itself.

Embodiment 1

Figure 1:
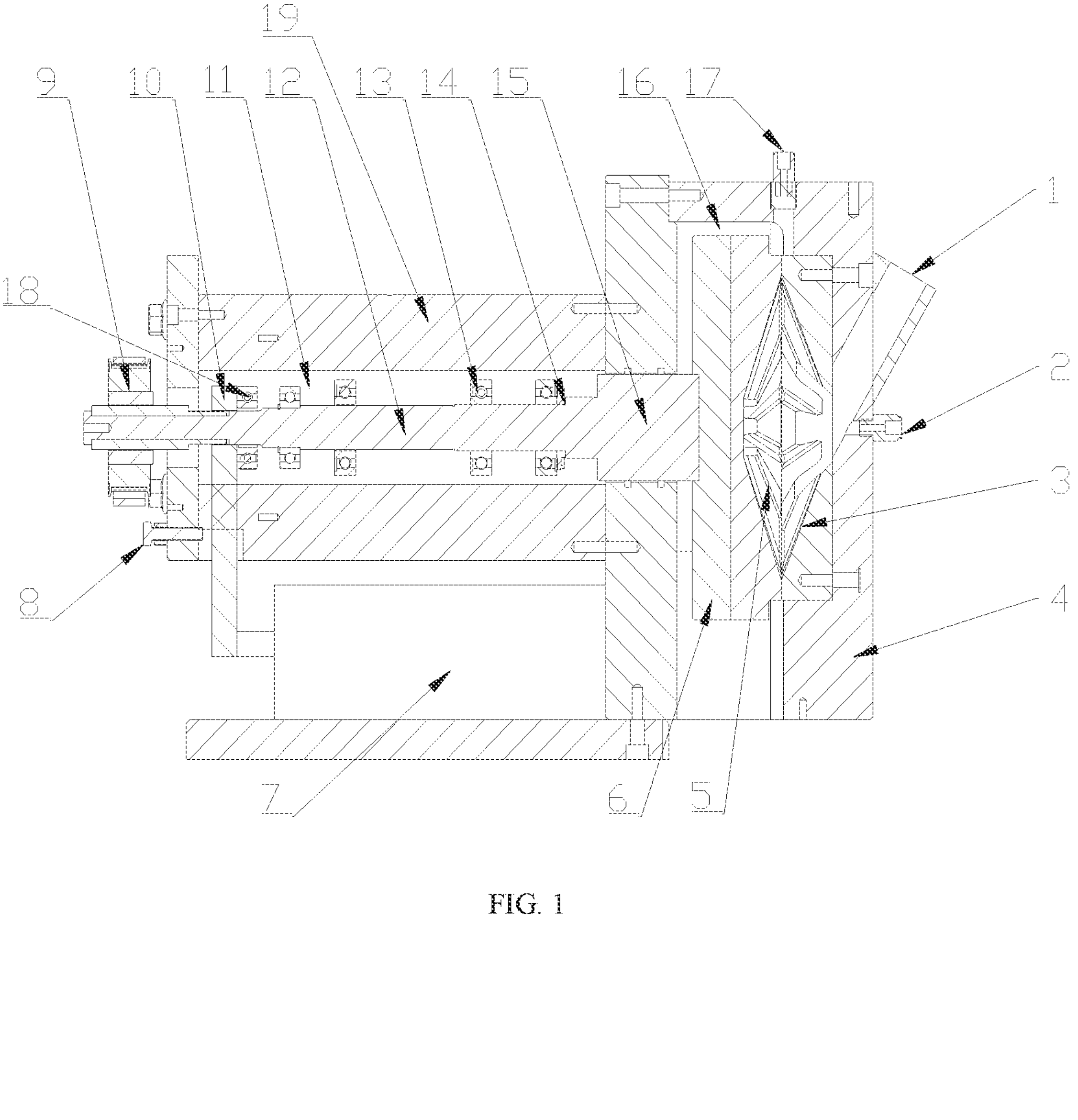
FIG. 1 is a sectional view of a solid material grinding device with an adjustable discharge size according to Embodiment 1 of the present disclosure.
Figure 2:
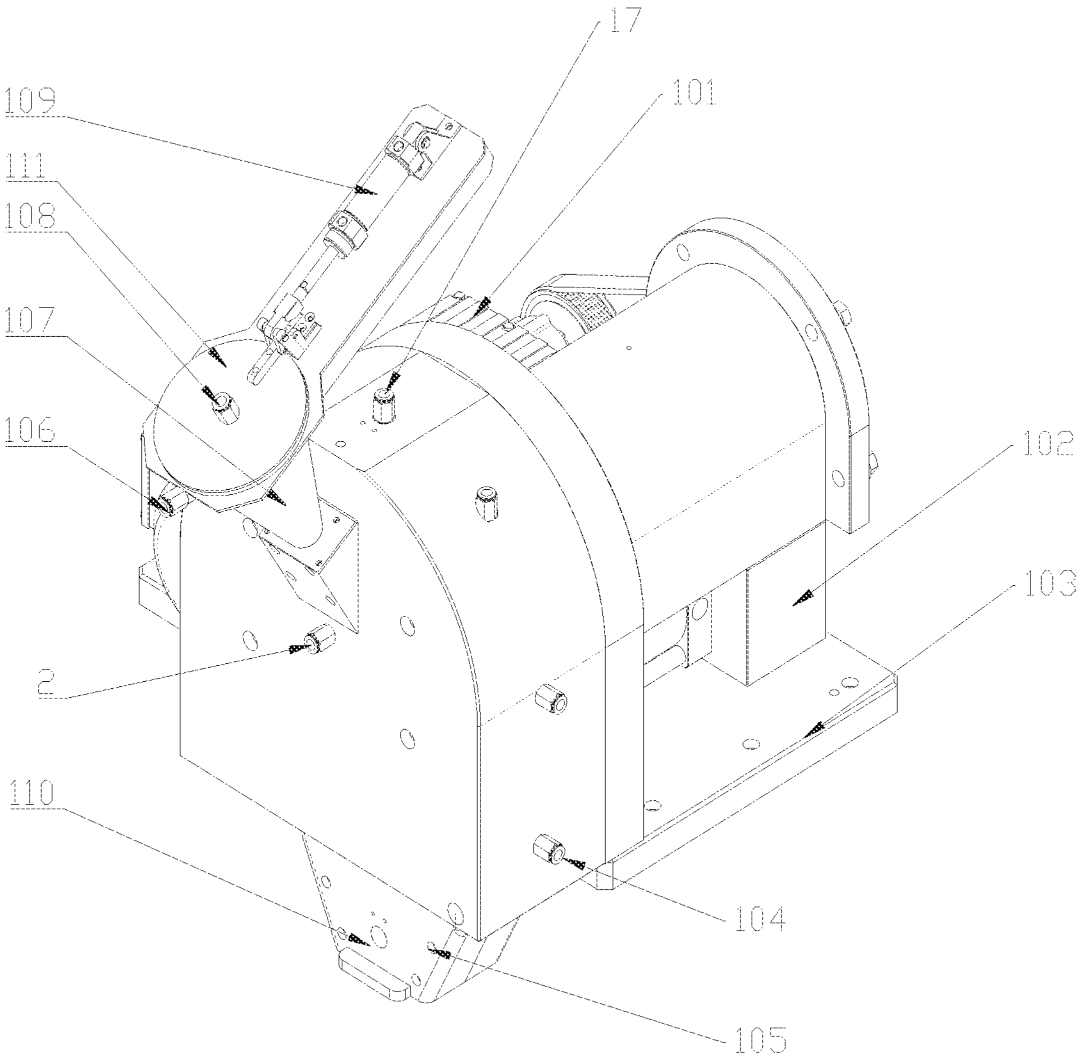
FIG. 2 is a perspective view of a solid material grinding device with an adjustable discharge size according to Embodiment 1 of the present disclosure.

As shown in FIG. 1 and FIG. 2, a solid material grinding device with an adjustable discharge size is provided.

Grinding disc housing 4 is provided thereon with feed inlet 1, a discharge outlet, top rectifying blower 17, side edge rectifying blower 104, and central rectifying blower 2.

Movable grinding disc 5 and stationary grinding disc 3 are provided in grinding disc cavity 16 of the grinding disc housing 4 coaxially with grinding surfaces opposite to each other. The stationary grinding disc 3 is fixed with the grinding disc housing 4. The movable grinding disc 5 is driven by a drive mechanism to rotate in the grinding disc housing 4, thereby grinding materials between the movable grinding disc 5 and the stationary grinding disc 3. The movable grinding disc 5 is further connected to a pushing mechanism. The pushing mechanism adjusts the distance between the movable grinding disc 5 and the stationary grinding disc 3 in a push-and-pull manner.

The top rectifying blower 17 blows gas from an upward side of the movable grinding disc 5 and the stationary grinding disc 3 along a radial direction of the movable grinding disc 5 and the stationary grinding disc 3. The side edge rectifying blower 104 blows gas from a lateral side of the movable grinding disc 5 and the stationary grinding disc 3 along the radial direction of the movable grinding disc 5 and the stationary grinding disc 3. The central rectifying blower 2 blows gas to the center of the stationary grinding disc 3 along an axial direction of the movable grinding disc 5 and the stationary grinding disc 3.

Specifically, the grinding disc cavity 16 is provided in the grinding disc housing 4. The feed inlet 1 and the discharge outlet are arranged on the grinding disc housing 4. The top rectifying blower 17 is provided on the grinding disc housing 4. Sidewalls at two sides of the grinding disc housing 4 are respectively provided with the side edge rectifying blower 104. A sidewall of the grinding disc housing 4 toward the grinding disc cavity 16 is provided with the central rectifying blower 2.

Figure 5:
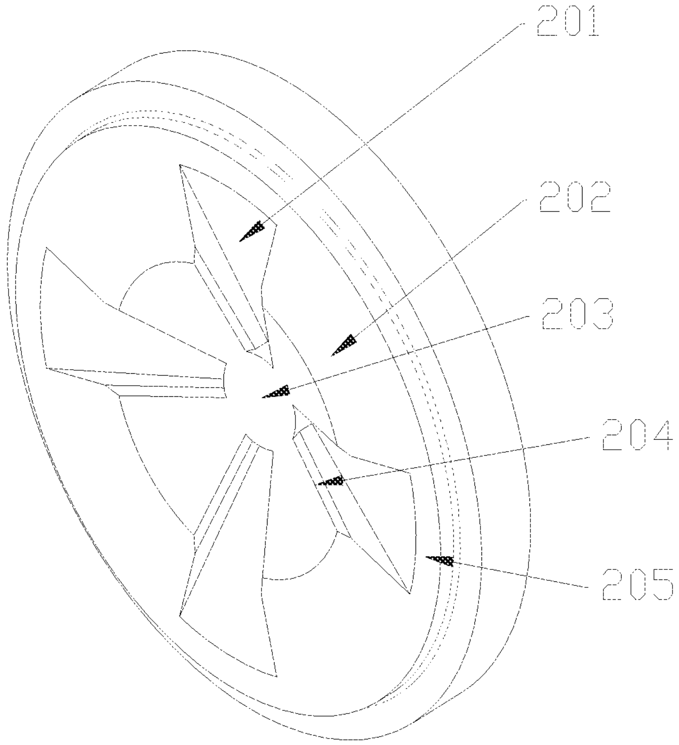
FIG. 5 is a structural view of a movable grinding disc and a stationary grinding disc in a solid material grinding device with an adjustable discharge size according to Embodiment 1 and Embodiment 2 of the present disclosure.

The movable grinding disc 5 and the stationary grinding disc 3 have the same shape and structure. As shown in FIG. 5, the movable grinding disc 5 and the stationary grinding disc 3 each are provided in a fan-shaped manner with the grinding disc as a main body and the center of the grinding surface of the grinding disc as a circular point with adjacent convex surfaces 202 and concave surfaces 201. An outer edge surrounding the convex surfaces 202 and the concave surfaces 201 on the grinding surface of the grinding disc refers to grinding side edge 205. Grinding cavity 203 is formed between the movable grinding disc 5 and the stationary grinding disc 3. The concave surfaces 201 are connected to the grinding cavity 203. Convex-surface side edge 204 communicates with the concave surfaces 201 and the convex surfaces 202. The convex-surface side edge 204 is inclined at a certain angle. The inclined convex-surface side edge 204 has a certain width.

As shown in FIG. 5, the adjacent convex surface 202 and concave surface 201 are formed into a group. There are 2-6 groups of concave and convex surfaces on the grinding surface of the circular grinding disc.

The drive mechanism includes outer housing 19, central shaft 12, fixed bearings 13, chain wheel 9, and transmission motor 101.

Central shaft cavity 11 is formed in the outer housing 19. The central shaft 12 is provided in the central shaft cavity 11 and includes one end coaxially connected to the movable grinding disc 5 (one end of the central shaft 12 is coaxially connected to a non-grinding surface directly facing the grinding surface on the movable grinding disc 5).

For the convenience of assembly, preferably, an end portion of the central shaft 12, central shaft mounting seat 15, movable grinding disc mounting seat 6 and the movable grinding disc 5 are sequentially and coaxially connected (the movable grinding disc mounting seat 6 is coaxially connected to the non-grinding surface directly facing the grinding surface on the movable grinding disc 5).

A plurality of the fixed bearings 13 is sleeved on the central shaft 12 and uniformly distributed along an axial direction of the central shaft 12. The central shaft 12 and the fixed bearings 13 can slide along the axial direction of the central shaft. Annular groove 14 is formed at one side of the fixed bearing 13. There can be any number of fixed bearings 13, such as 1-3. The annular groove 14 is configured to locate a maximum sliding distance of the central shaft 12.

The chain wheel 9 is sleeved on the other end of the central shaft 12 and provided outside the outer housing 19. The transmission motor 101 is in transmission connection with the chain wheel 9 through a chain.

The outer housing 19 may be connected to the grinding disc housing 4. The grinding disc housing 4 may be fixed on base 103. Support seat 102 is connected between the outer housing 19 and the base 103. The support seat 102 is configured to support the outer housing 19. The transmission motor 101 may be fixed on the outer housing 19.

The pushing mechanism includes master cylinder 7, bearing sleeve 18, and connecting plate 10. An axial direction of the master cylinder 7 is parallel to the axial direction of the central shaft 12. A cylinder barrel of the master cylinder 7 may be horizontally placed on the base 103 and fixed with the base 103.

The bearing sleeve 18 is connected to one of the fixed bearings 13. As shown in FIG. 1, the bearing sleeve 18 is connected to the fixed bearing 13 on a left end portion of the central shaft 12.

The connecting plate 10 is respectively connected to the bearing sleeve 18 and an end portion of a piston rod in the master cylinder 7.

At least one limiting bolt 8 abuts against the connecting plate 10 through the outer housing 19. An axial direction of the at least one limiting bolt 8 is parallel to the axial direction of the central shaft 12.

As shown in FIG. 1, the feed inlet 1 extends toward the center of the stationary grinding disc 3. The feed inlet 1 extends obliquely into the stationary grinding disc 3. Receiving hopper 107 is provided on the feed inlet 1. The discharge outlet is located at a bottom of the grinding disc housing 4. Collecting hopper 105 is provided on the discharge outlet.

Top cover 111 controlled by cover-opening cylinder 109 to open and close is provided on an opening of the receiving hopper 107. Cylinder top cover rectifying blower 108 blowing gas to the receiving hopper 107 is provided on the top cover 111. Cylinder sidewall rectifying blower 106 blowing gas to the receiving hopper 107 is provided at a lateral side of the receiving hopper 107 and near the top cover 111.

The solid material grinding device with an adjustable discharge size has the following grinding method:

Materials are fed to the grinding disc housing. The materials are semi-fluidized through interaction among the central rectifying blower 2, the top rectifying blower 17, and the side edge rectifying blower 104. Semi-fluidized material particles are crushed through a relative movement between the movable grinding disc 5 and the stationary grinding disc 3.

The solid material grinding device with an adjustable discharge size in the embodiment has the following technical features: (1) There is no collision between metals in the grinding process. Test material particles are crushed through the relative movement between the movable grinding disc 5 and the stationary grinding disc 3. The movable grinding disc 5 and the stationary grinding disc 3 each are provided in a fan-shaped manner with the grinding disc as a main body and the center of the grinding surface of the grinding disc as a circular point with adjacent convex surfaces 202 and concave surfaces 201. The adjacent convex surface 202 and concave surface 201 are formed into a group. There are 2-6 groups of concave and convex surfaces on the grinding surface of the circular grinding disc. An outer edge surrounding the convex surfaces 202 and the concave surfaces 201 on the grinding surface of the grinding disc refers to the grinding side edge 205. The convex-surface side edge 204 is inclined at a certain angle. The inclined convex-surface side edge has a certain width. Grinding cavity 203 is formed between the movable grinding disc 5 and the stationary grinding disc 3. The grinding cavity 203 is a clearance between the movable grinding disc 5 and the stationary grinding disc 3. Materials to be ground will be ground in the cavity. The concave surfaces 201 are connected to the grinding cavity 203 to store the materials. The convex-surface side edge 204 communicates with the concave surfaces 201 and the convex surfaces 202. In response to the rotation of the movable grinding disc, the convex-surface side edge 204 cuts and crushes the materials while guiding a part of the materials to clearances between the convex surfaces 202. The materials are ground between the convex surfaces 202 and the grinding side edge 205 into particles with an appropriate size.

(2) The gas is pretreated. Gas charged to the grinding device is cooled in advance with a refrigerating device. The refrigerating device may use a compressor, a semiconductor, a vortex tube, and the like for refrigeration. Cooling the gas can take away heat in the grinding process, reduce water vapor in the gas, and prevent water in the gas from affecting the ground materials.

(3) The gas is semi-fluidized. The materials enter the receiving hopper 107. Under the cooperation of gas flows from the cylinder top cover rectifying blower 108 and the cylinder sidewall rectifying blower 106, the material particles enter the grinding cavity 203. The materials in the grinding cavity 203 are semi-fluidized under the cooperation among the central rectifying blower 2, the top rectifying blower 17, and the side edge rectifying blower 104, such that the materials of different sizes contact the grinding surface more frequently to improve the grinding efficiency. The gas can take away heat caused by collision so the properties of the material particles are not affected. Meanwhile, the gas can take away particles of sizes less than a clearance between the grinding surfaces to prevent repeated grinding, shorten grinding time, and prevent a superfine size.

(4) Regarding rectifying gas in a gas field: There are one to four top rectifying blowers 17 and one to four side edge rectifying blowers 104. The gas from the rectifying blowers enters the central shaft cavity 11. A flow field formed by the gas surrounds the movable grinding disc 5 and the stationary grinding disc 3 to keep the temperature stable. Particles flowing from the grinding surfaces enter the collecting hopper 105. Upon completion of the grinding, a flow of rectifying gas is increased to realize a purge function. The flow changes at a certain amplitude and a certain frequency in cooperation with a grinding clearance, thus cleaning residues in the grinding cavity.

(5) The clearance between the grinding surfaces is adjustable. Maximum sizes of the ground particles depend on the clearance between the convex surfaces of the movable grinding disc 5 and the stationary grinding disc 3. Positions of the limiting groove 14 and the limiting bolt 8 determine the distance between the mobile grinding surface and the stationary grinding surface. The mobile grinding surface is fixed in the grinding process with the pressure of the master cylinder 7. After the master cylinder 7 is loosened, the distance between the mobile grinding surface and the stationary grinding surface is expanded for the convenience of cleaning.

(6) Regarding fixation of the central shaft: The central shaft 12 is fixed in the central shaft cavity 11 through two to six fixed bearings 13. The movable grinding disc 5 is fixed with the movable grinding disc mounting seat 6 through three to fifteen bolts. The bolts may be arranged in form of a concentric circle, a square, etc. Through the bolts, not only can the movable grinding disc 5 be fixed, but also fine adjustments can be made to the flatness of the mobile grinding surface. The movable grinding disc mounting seat 6 is connected to the central shaft mounting seat 15.

(7) Regarding slippage of the central shaft: The central shaft 12 and the fixed bearings 13 may slide along the axial direction of the central shaft. Limiting groove 14 is formed at one side of the one to three fixed bearing 13. The limiting groove 14 is an annular groove. The annular limiting groove 14 is configured to locate a maximum sliding distance of the central shaft 12.

(8) One end of the central shaft 12 is connected to an end portion of the piston rod in the master cylinder 7 through the connecting plate 10. The connecting plate 10 is connected to the bearing sleeve 18. The bearing sleeve 18 is connected to the fixed bearing 13 at the other end of the central shaft 12. The bearing sleeve 18 may drive the central shaft 12 to slide. Under the driving of the master cylinder 7, the central shaft 12 may slide within a certain distance. Consequently, the movable grinding disc 5 moves to adjust the distance between the movable grinding disc 5 and the stationary grinding disc 3.

(9) Regarding adjustment of a minimum clearance: The connecting plate 10 is connected to the bearing sleeve 18. By adjusting the length of the limiting bolt 8 exposed out of the connecting plate, a minimum clearance between the movable grinding disc 5 and the stationary grinding disc 3 is determined.

(10) Regarding a feeding mode: The materials are fed from the center of the stationary grinding disc 3 through the receiving hopper 107. In this mode, the materials enter the grinding cavity quickly to improve efficiency. On the other hand, the materials that come in close contact with the gas source quickly enter a semi-fluidized state, and thus, the materials contact the grinding surface more frequently. When the solid material grinding device with an adjustable discharge size is in operation, the cylinder sidewall rectifying blower 106 and the cylinder top cover rectifying blower 108 each charge a certain amount of gas continuously, such that the materials are not reversely blown back to the receiving hopper 107.

(11) Regarding the collection of the ground materials: The annular grinding disc housing 4 is provided outside the movable grinding disc 5 and the stationary grinding disc 3. The grinding disc housing 4 communicates with the collecting hopper 105. Vent 110 is formed in the collecting hopper 105. A replaceable filter cotton is provided in the vent 110. By charging the gas to the vent 110, materials in the collecting hopper 105 are discharged more quickly.

The solid material grinding method and device with an adjustable discharge size are applied to crushing solid minerals. With a clearance fit between the movable grinding disc and the stationary grinding disc, the present disclosure prevents collision between metals in the grinding process to obtain a higher energy utilization efficiency. The present disclosure ensures stable properties of mineral particles by reducing the temperature rise in the grinding process and obtains an accurate size of the product by accurately controlling the grinding clearance.

Embodiment 2

The solid material grinding device with an adjustable discharge size in the embodiment is a further improvement to the structure in Embodiment 1. Parts same as or corresponding to those in Embodiment 1 use the same or corresponding numerals in Embodiment 1. For simplicity, only differences between Embodiment 2 and Embodiment 1 are described herein.

Figure 3:
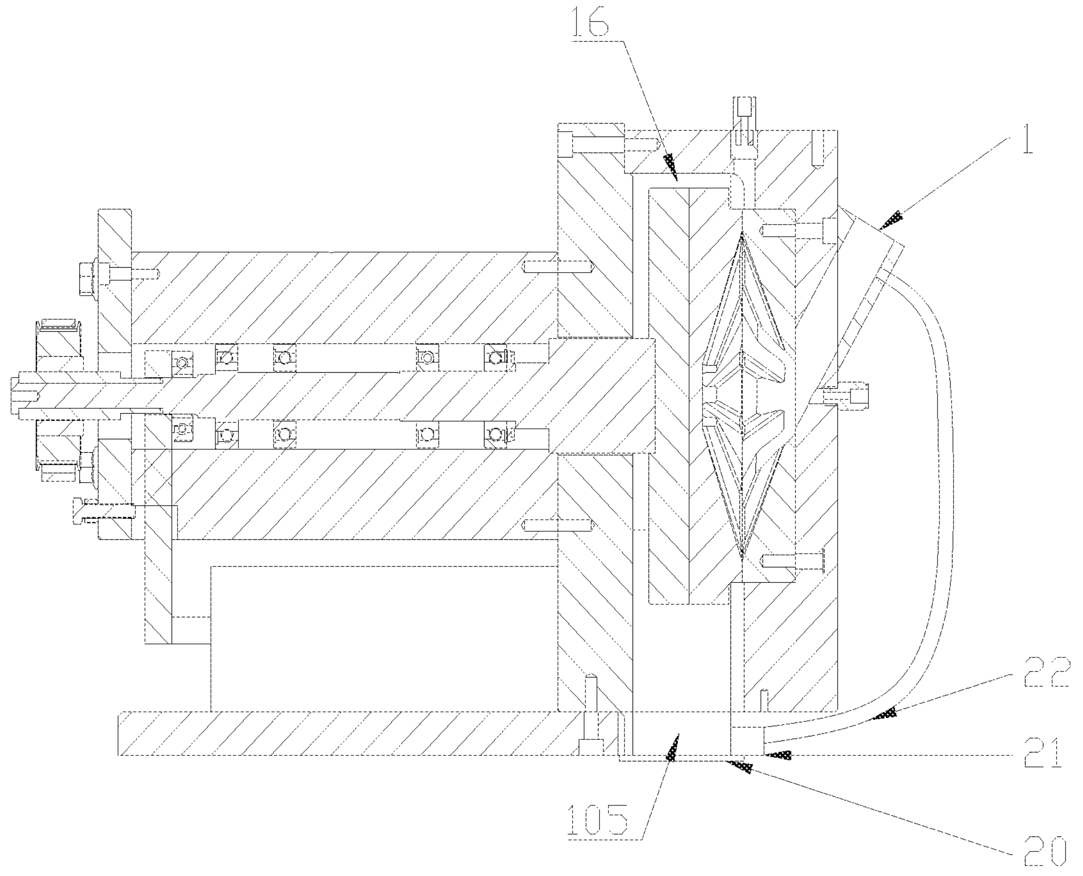
FIG. 3 is a sectional view of a solid material grinding device with an adjustable discharge size according to Embodiment 2 of the present disclosure.
Figure 4:
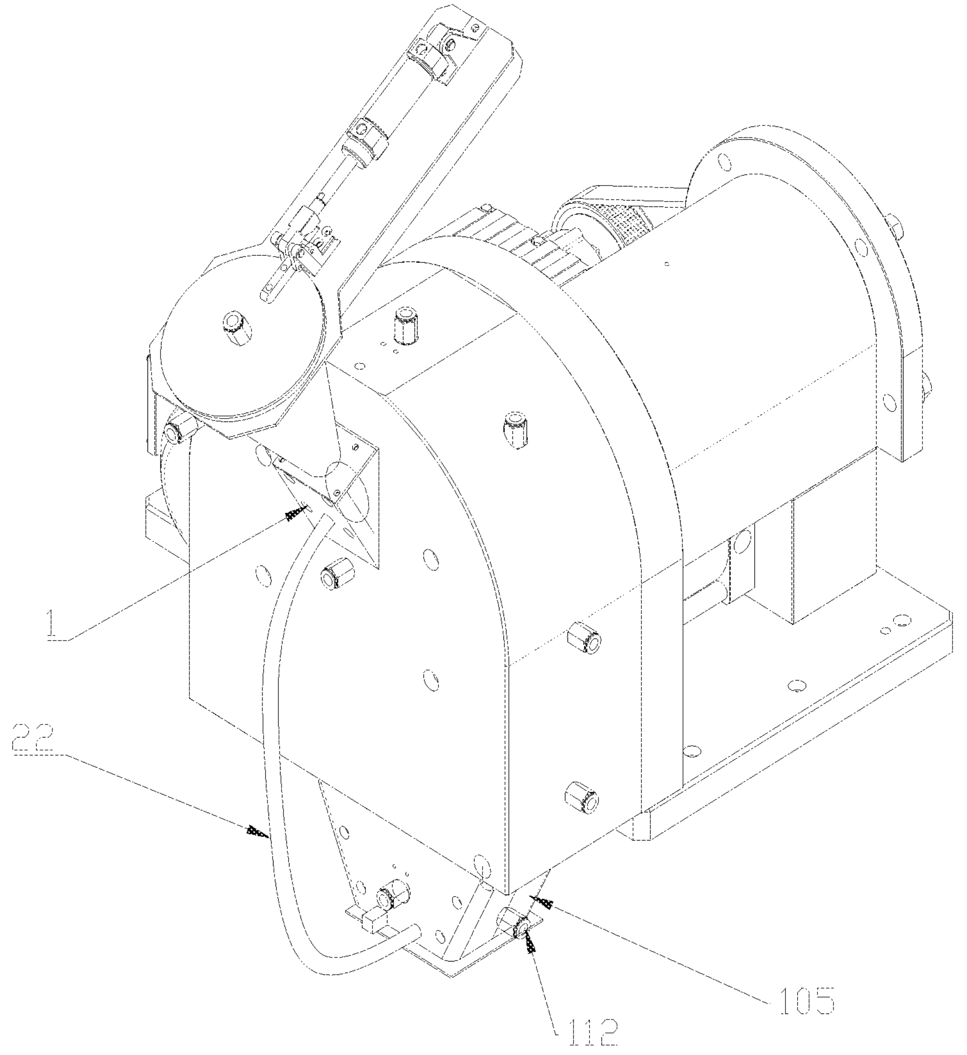
FIG. 4 is a perspective view of a solid material grinding device with an adjustable discharge size according to Embodiment 2 of the present disclosure.

As shown in FIG. 3 and FIG. 4, vibrating sieve 20 controlled by vibrating motor 21 to vibrate is provided at an outlet of the collecting hopper 105. (Both the vibrating sieve 20 and the vibrating motor 21 are existing products in the market).

The collecting hopper 105 and the feed inlet communicate with each other through reverse material blowing tube 22. Reverse blower 112 communicating with a gas-blowing device is further provided on the collecting hopper 105. The reverse blower 112 is located at the side of the collecting hopper 105. When the solid material grinding device with an adjustable discharge size works, the reverse blower 112 communicates with the gas-blowing device.

The solid material grinding device with an adjustable discharge size in the embodiment can change the vibrating sieve 20 of different pore sizes as required. The vibrating sieve 20 may be driven by the vibrating motor 21 to vibrate. Under the combined action of the vibration and the gas flow in the grinding disc cavity 16, particles having sizes less than the pore size of the vibrating sieve 20 may fall (e.g., may be filtered) through the sieve. In the grinding process, the vibrating motor 21 may be turned on all the time or at a fixed interval.

After the grinding process lasts for a period of time, the transmission motor 101 and the vibrating sieve 20 cease operation, the distance between the movable grinding disc 5 and the stationary grinding disc 3 is increased, and the remaining materials in the grinding cavity 203 drop. Thereafter, the distance between the movable grinding disc 5 and the stationary grinding disc 3 is restored. The vibrating motor 21 stops after being turned on for a period of time. The gas-blowing device is turned on to reversely blow the gas, such that the materials on the vibrating sieve 20 are sent back to the feed inlet 1 through the reverse material blowing tube 112. The vibrating sieve 20 can realize automatic material returning, and thus, the final sieving rate reaches 100%. This is the automatic material return.

After the grinding process lasts for a period of time, the transmission motor 101 and the vibrating sieve 20 ceases operation, the distance between the movable grinding disc 5 and the stationary grinding disc 3 is increased, and the remaining materials in the grinding cavity 203 drop. Thereafter, the distance between the movable grinding disc 5 and the stationary grinding disc 3 is restored. The vibrating motor 21 stops after being turned on for a period of time. The vibrating sieve 20 is taken down manually. Materials on the sieve are poured into the feed inlet 1. The above operation is repeated until the sieving rate reaches 100%. This is the manual material returning.

By adjusting the power of the vibrating motor 21 or changing the main vibrating direction and the vibrating frequency of the vibrating motor 21, the vibrating motor in work can drive the grinding cavity 203 to vibrate, thereby cleaning surfaces of the movable grinding disc 5 and the stationary grinding disc 3, and cleaning an inner surface of the grinding cavity 203. In response to self-cleaning, the distance between the movable grinding disc 5 and the stationary grinding disc 3 changes. In cooperation with continuous or pulsed gas provided by each blower, residual samples on the surfaces of the movable grinding disc 5 and the stationary grinding disc 3 are purged. Through the above actions, both an inner wall of the grinding cavity 203 and a screen of the vibrating sieve 20 can be cleaned. The above only describes some exemplary embodiments of the present disclosure in an illustrative manner. Undoubtedly, the described embodiments can be modified by those of ordinary skilled in the art in different manners without departing from the spirit and scope of the present disclosure. Therefore, the above-accompanying drawings and descriptions are substantially illustrative and should not be understood as a limit to the scope of protection of the claims in the present disclosure.

What is claimed is:

1. A solid material grinding device with an adjustable discharge size, comprising:

a grinding disc housing provided thereon with a feed inlet, a discharge outlet, a top rectifying blower, a side edge rectifying blower, and a central rectifying blower; and a movable grinding disc and a stationary grinding disc provided in a grinding disc cavity of the grinding disc housing coaxially with grinding surfaces opposite to each other, wherein the stationary grinding disc is fixed with the grinding disc housing;

the movable grinding disc is driven by a drive mechanism to rotate in the grinding disc housing, thereby grinding materials between the movable grinding disc and the stationary grinding disc;

the movable grinding disc is further connected to a pushing mechanism;

the pushing mechanism adjusts a distance between the movable grinding disc and the stationary grinding disc in a push-and-pull manner;

the top rectifying blower and the side edge rectifying blower respectively blow gas from an upward side and a lateral side of the movable grinding disc and the stationary grinding disc along a radial direction of the movable grinding disc and the stationary grinding disc; and the central rectifying blower blows gas to a center of the stationary grinding disc along an axial direction of the movable grinding disc and the stationary grinding disc.

2. The solid material grinding device with the adjustable discharge size according to claim 1, wherein the movable grinding disc and the stationary grinding disc have same shape and structure;

the movable grinding disc and the stationary grinding disc each are provided in a fan-shaped manner by taking the grinding disc as a main body and a center of the grinding surface of the grinding disc as a circular point with adjacent convex surfaces and concave surfaces;

an outer edge surrounding the convex surfaces and the concave surfaces on the grinding surface of the grinding disc is used as a grinding side edge; a grinding cavity is formed between the movable grinding disc and the stationary grinding disc; the concave surfaces are connected to the grinding cavity; a convex-surface side edge communicates with the concave surfaces and the convex surfaces; each convex surface of the convex surfaces pair with each adjacent concave surface of the concave surfaces to form groups; and the grinding surface of each of the movable grinding disc and the stationary grinding disc comprises two to six of the groups.

3. The solid material grinding device with the adjustable discharge size according to claim 1, wherein the drive mechanism comprises:

an outer housing;

a central shaft provided in a central shaft cavity of the outer housing and comprising a first end coaxially connected to the movable grinding disc;

a plurality of fixed bearings sleeved on the central shaft and uniformly distributed along an axial direction of the central shaft;

a chain wheel sleeved on a second end of the central shaft and provided outside the outer housing; and a transmission motor in transmission connection with the chain wheel through a chain.

4. The solid material grinding device with the adjustable discharge size according to claim 3, wherein the pushing mechanism comprises:
a master cylinder having an axial direction parallel to the axial direction of the central shaft;
a bearing sleeve connected to one of the plurality of fixed bearings; and
a connecting plate respectively connected to the bearing sleeve and an end portion of a piston rod in the master cylinder.

5. The solid material grinding device with the adjustable discharge size according to claim 4, further comprising at least one limiting bolt abuts against the connecting plate through the outer housing, wherein an axial direction of the at least one limiting bolt is parallel to the axial direction of the central shaft.

6. The solid material grinding device with the adjustable discharge size according to claim 1, wherein the feed inlet extends toward the center of the stationary grinding disc; a receiving hopper is provided on the feed inlet; and a collecting hopper is provided on the discharge outlet.

7. The solid material grinding device with the adjustable discharge size according to claim 6, further comprising a top cover controlled by a cover-opening cylinder to open and close provided on an opening of the receiving hopper; a cylinder top cover rectifying blower blowing gas to the receiving hopper provided on the top cover; and a cylinder sidewall rectifying blower blowing gas to the receiving hopper provided at a lateral side of the receiving hopper and near the top cover.

8. The solid material grinding device with the adjustable discharge size according to claim 6, further comprising a vibrating sieve controlled by a vibrating motor to vibrate provided at an outlet of the collecting hopper.

9. The solid material grinding device with the adjustable discharge size according to claim 6, wherein the collecting hopper and the feed inlet communicate with each other through a reverse material blowing tube; and a reverse blower communicating with a gas blowing device is further provided on the collecting hopper.

10. A grinding method for using the solid material grinding device with the adjustable discharge size according to claim 1, the grinding method comprises:
feeding the materials to the grinding disc housing, wherein the materials are semi-fluidized through an interaction among the central rectifying blower, the top rectifying blower, and the side edge rectifying blower; and semi-fluidized material particles are crushed through a relative movement between the movable grinding disc and the stationary grinding disc.

11. The grinding method according to claim 10, wherein the movable grinding disc and the stationary grinding disc are configured to have same shape and structure;
providing the movable grinding disc and the stationary grinding disc in a fan-shaped manner by taking the grinding disc as a main body and a center of the grinding surface of the grinding disc as a circular point with adjacent convex surfaces and concave surfaces;
using an outer edge surrounding the convex surfaces and the concave surfaces on the grinding surface of the grinding disc as a grinding side edge; a grinding cavity is formed between the movable grinding disc and the stationary grinding disc; the concave surfaces are connected to the grinding cavity; a convex-surface side edge communicates with the concave surfaces and the convex surfaces; each convex surface of the convex surfaces pair with each adjacent concave surface of the concave surfaces to form groups;
and the grinding surface of each of the movable grinding disc and the stationary grinding disc comprises two to six of the groups.

12. The grinding method according to claim 10, wherein the drive mechanism is further configured to comprise:
an outer housing;
a central shaft provided in a central shaft cavity of the outer housing and comprising a first end coaxially connected to the movable grinding disc;
a plurality of fixed bearings sleeved on the central shaft and uniformly distributed along an axial direction of the central shaft;
a chain wheel sleeved on a second end of the central shaft and provided outside the outer housing; and
a transmission motor in transmission connection with the chain wheel through a chain.

13. The grinding method according to claim 12, wherein the pushing mechanism is further configured to comprise:
a master cylinder having an axial direction parallel to the axial direction of the central shaft;
a bearing sleeve connected to one of the plurality of fixed bearings; and
a connecting plate respectively connected to the bearing sleeve and an end portion of a piston rod in the master cylinder.

14. The grinding method according to claim 13, wherein at least one limiting bolt is configured to abut against the connecting plate through the outer housing, wherein an axial direction of the at least one limiting bolt is parallel to the axial direction of the central shaft.

15. The grinding method according to claim 10, wherein the feed inlet is configured to extend toward the center of the stationary grinding disc; a receiving hopper is provided on the feed inlet; and a collecting hopper is provided on the discharge outlet.

16. The grinding method according to claim 15, wherein a top cover controlled by a cover-opening cylinder is configured to open and close provided on an opening of the receiving hopper; a cylinder top cover rectifying blower blowing gas to the receiving hopper provided on the top cover; and a cylinder sidewall rectifying blower blowing gas to the receiving hopper provided at a lateral side of the receiving hopper and near the top cover.

17. The grinding method according to claim 15, wherein a vibrating sieve is configured to be controlled by a vibrating motor to vibrate at an outlet of the collecting hopper.

18. The grinding method according to claim 15, wherein the collecting hopper and the feed inlet are configured to communicate with each other through a reverse material blowing tube; and a reverse blower communicating with a gas blowing device is further provided on the collecting hopper.

* * * * *